(12) United States Patent
McKelvey et al.

(10) Patent No.: US 8,555,059 B2
(45) Date of Patent: Oct. 8, 2013

(54) SECURE LOCAL UPDATE OF CONTENT MANAGEMENT SOFTWARE

(75) Inventors: Alexander McKelvey, Seattle, WA (US); Clifford P. Strom, Sammamish, WA (US); Quintin S. Burns, Fort Mills, SC (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 12/762,169

(22) Filed: Apr. 16, 2010

(65) Prior Publication Data

US 2011/0258437 A1 Oct. 20, 2011

(51) Int. Cl.
*H04L 29/06* (2006.01)

(52) U.S. Cl.
USPC ........... 713/165; 713/168; 713/169; 713/193; 713/189; 726/23

(58) Field of Classification Search
USPC ........................................ 713/165
See application file for complete search history.

(56) References Cited

U.S. PATENT DOCUMENTS

| | | | |
|---|---|---|---|
| 7,024,564 B2 | 4/2006 | Pavlin et al. | |
| 7,319,759 B1 | 1/2008 | Peinado et al. | |
| 7,380,275 B2 | 5/2008 | Srinivasan et al. | |
| 7,441,121 B2 | 10/2008 | Cutter, Jr. et al. | |
| 2003/0194094 A1* | 10/2003 | Lampson et al. | 380/282 |
| 2004/0088559 A1* | 5/2004 | Foster et al. | 713/193 |
| 2004/0117663 A1 | 6/2004 | Colvin | |
| 2006/0101454 A1* | 5/2006 | Whitehead | 717/168 |
| 2006/0107032 A1* | 5/2006 | Paaske et al. | 713/2 |
| 2006/0159269 A1* | 7/2006 | Braun et al. | 380/277 |
| 2008/0022131 A1 | 1/2008 | Ueda et al. | |
| 2008/0235517 A1* | 9/2008 | Ohmori et al. | 713/187 |
| 2008/0301466 A1* | 12/2008 | Hsu et al. | 713/189 |
| 2009/0089579 A1* | 4/2009 | Murase et al. | 713/164 |
| 2009/0138699 A1* | 5/2009 | Miyazaki et al. | 713/150 |
| 2009/0138728 A1* | 5/2009 | Fujiwara et al. | 713/193 |
| 2009/0150672 A1* | 6/2009 | Kwon et al. | 713/169 |
| 2009/0204572 A1* | 8/2009 | Takashima et al. | 707/3 |
| 2009/0204806 A1* | 8/2009 | Kanemura et al. | 713/155 |
| 2009/0217054 A1* | 8/2009 | Haider et al. | 713/189 |
| 2009/0327722 A1 | 12/2009 | Harker | |
| 2010/0002871 A1* | 1/2010 | Nakano et al. | 380/28 |
| 2010/0082955 A1* | 4/2010 | Chhabra et al. | 713/1 |
| 2010/0122088 A1* | 5/2010 | Oxford | 713/168 |
| 2010/0174909 A1* | 7/2010 | Ashdown | 713/171 |
| 2010/0180343 A1* | 7/2010 | Maeda et al. | 726/23 |
| 2010/0185859 A1* | 7/2010 | Unagami et al. | 713/168 |

OTHER PUBLICATIONS

McFadden, Andy, "Backward compatibility for Android applications", Retrieved at<<http://android-developers.blogspot.com/2009/04/backward-compatibility-for-android.html>>, Apr. 28, 2009, pp. 11.

* cited by examiner

*Primary Examiner* — Ashok Patel
*Assistant Examiner* — Gary Gracia
(74) *Attorney, Agent, or Firm* — Wolfe-SBMC

(57) ABSTRACT

This document describes tools that enable a computing device to receive an update to content management software. The tools also enable the computing device to generate new public and private keys without the use of a key server.

20 Claims, 6 Drawing Sheets

US 8,555,059 B2

SECURE LOCAL UPDATE OF CONTENT MANAGEMENT SOFTWARE

BACKGROUND

Conventional content management software uses public keys to protect content and private keys to access protected content. Even though the private keys are stored in an encrypted form on computing devices running the content management software, malicious individuals may obtain a private key on a device and gain access to the content. In response to this security breach, conventional approaches update the public and private keys on devices so that new content remains protected. This update is performed using a key server. While this update is generally secure, data (though encrypted) may be accessed and analyzed by malicious individuals as it travels over networks connecting a device to the key server. Furthermore, this update method requires a key server and uses network bandwidth.

SUMMARY

This document describes tools that enable a computing device to receive an update to content management software. The tools also enable the computing device to generate new public and private keys without the use of a key server.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes tools that enable a computing device to receive an update to content management software. In one embodiment, a computing device generates new public and private keys without the use of a key server. By so doing the computing device is able to securely update the content management software without consuming network bandwidth and server resources associated with remotely generating the public and private keys. Furthermore, the private keys are not discoverable by analyzing network traffic as they are not transmitted via a network.

Example Environment

Figure 1:
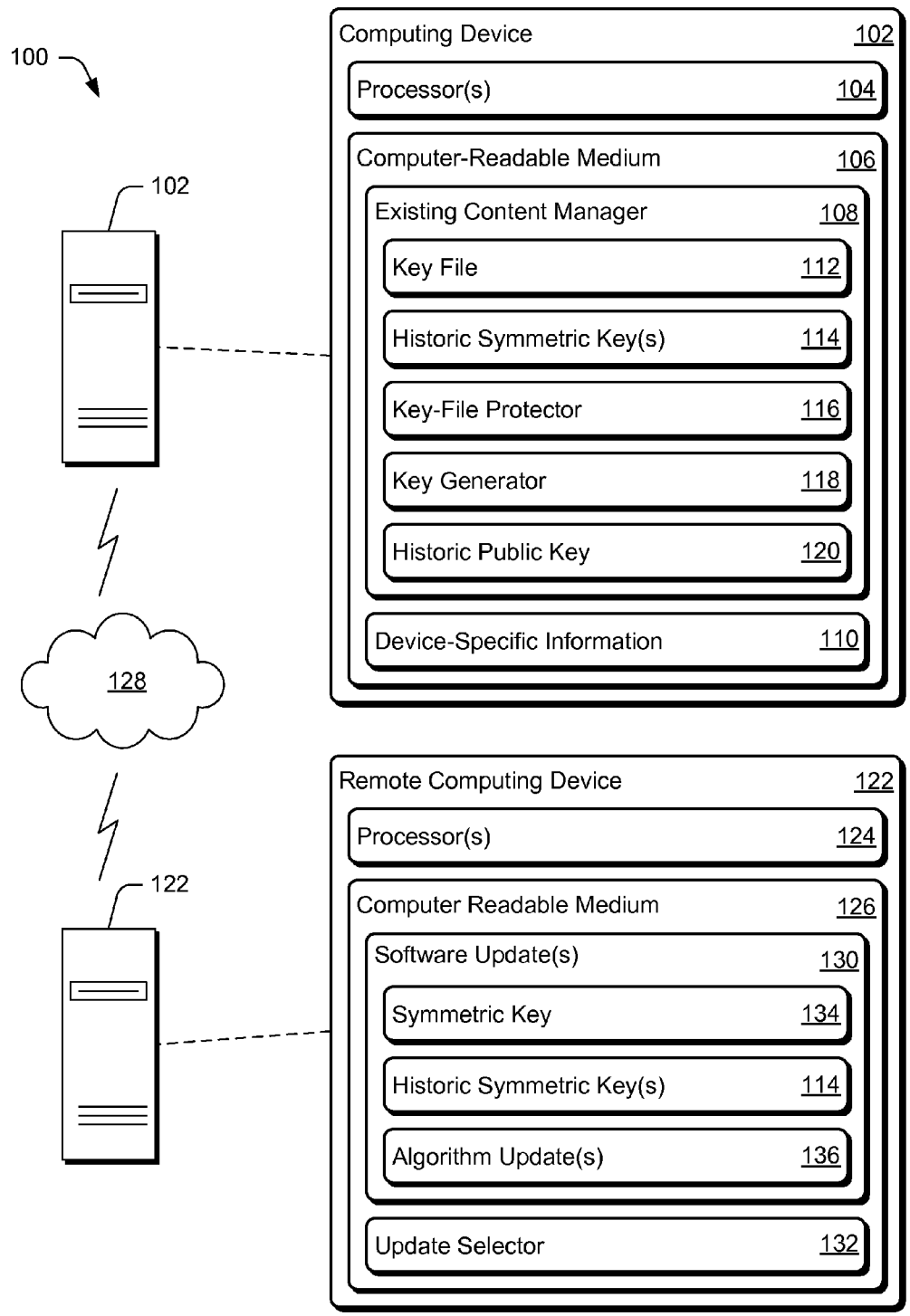
FIG. 1 is an illustration of an environment in which an existing content manager may be updated.

FIG. 1 is an illustration of an environment 100 in an example embodiment in which the tools may operate to update content management software by securely updating public/private key pairs without the use of a key server. Environment 100 includes a computing device 102, examples of which include a smart phone, a set-top box, a gaming console, a personal computer, or a media player, to name a few. Computing device 102 includes one or more processors 104 and computer-readable media 106. Computer-readable media 106 contains or has access to an existing content manager 108 and one or more instances of device-specific information 110. Examples of device-specific information 110 include a serial number or hardware identifier associated with one or more hardware components, a media-access-control (MAC) address associated with a network adapter, or a globally-unique-identifier (GUID), all of computing device 102, to name a few. Use of device-specific information 110 is discussed below.

Existing content manager 108 manages protected content on computing device 102. Protected content can include video, audio, image, and data files, electronic books and other electronic documents, computer games, and other computer applications. Existing content manager 108 provides authorized individuals and/or computing systems with access to the protected content while preventing access by others. Existing content manager 108 includes a key file 112, one or more historic symmetric keys 114, a key-file protector 116, a key generator 118, and an historic public key 120.

When existing content manager 108 is updated or upon its initial installation, key generator 118 generates a public/private key pair for content protection. The public/private key pair includes a public key, such as historic public key 120, and a private key. The public key is used to protect content, such as indirectly through protecting content keys. Content manager 108 uses the private key to access the protected content.

Key-file protector 116 uses a symmetric key, such as one of historic symmetric keys 114, to encrypt the private key before storing it in key file 112. Key-file protector 116 may use device-specific information 110 as part of the encryption algorithm in order to make the encryption unique to the device. For example, device-specific information 110 may be used to initialize a cryptographic algorithm by setting the algorithm's initialization vector. The public key is stored but not encrypted. Historic symmetric keys 114 and historic public key 120 are described as "historic" because they are associated with the current or historic versions of existing content manager 108. For example, historic public key 120 is the public key of a public/private key pair that was generated for use with the current version of existing content manager 108. Upon upgrading to a new version, a new public key will be generated as described above.

In some embodiments, computing device 102 is configured to communicate with remote computing device 122, such as a server computer. Remote computing device 122 includes one or more processors 124 and computer-readable media 126. Computing devices 102 and 122 may communicate through a communication network 128. Communication network 128 may include the Internet, a local-area network, a wide-area network, a wireless network, and/or a USB hub. In other embodiments, computer-readable media 126 is a portable computer-readable media such as a CD/DVD, a USB flash device, or a secure digital (SD) memory card and may be accessed directly by computing device 102.

Computer-readable media 126 contains or has access to one or more software updates 130 and update selector 132. Software updates 130 are updates for existing content manager 108. In some embodiments there are N sub-versions for each version of content manager 108. Each sub-version denotes a different subset of the same version of existing content manager 108. Use of sub-versions, each with a different symmetric key 114, provides additional security as gaining knowledge of a single symmetric key 114 will only be beneficial on 1/N computing devices. For example, consider that 1000 sub-versions existed in an original version of content manager 108. Sub-version five was selected using device-specific information 110. In this example, there are 1000 software updates 130, one for each of the possibly selected sub-versions. Update selector 132 is responsible for determining which sub-version was originally installed and thus with which of software updates 130 to upgrade. Update selector 132 may also be responsible for constructing software update 130 including adding the appropriate historic symmetric keys 114 and algorithm updates.

Software update 130 includes a symmetric key 134, one or more historic symmetric keys 114, and one or more algorithm updates 136. Symmetric key 134 is new to existing content manager 108 and is associated with software update 130. Key-file protector 116 uses symmetric key 134 to encrypt a new private key, which is generated by key generator 118 when software update 130 is applied to existing content manager 108. Symmetric key 134 may be generated at computing device 122 using a key-file-key seed. The key-file-key seed may affect the outcome of, or otherwise alter, cryptographic algorithms used to generate symmetric key 134 such that a master-secret key known by computing device 122 may be used to derive symmetric key 134 and thus indirectly be used to decrypt the private key. For example, consider that computing device 122 uses the key-file key seed to generate a symmetric key 134 for each version and/or sub-version of content manager 108. Computing device 122 retains the master-secret key and is able to use the master-secret key to decrypt private keys that had been encrypted using any of the generated symmetric keys 134. This is assuming that computing device 122 can gain access to device-specific information 110 if used to encrypt the private key.

Historic symmetric keys 114 may be included in software update 130, which overwrites existing content manager 108 with a new version. Alternatively, software update 130 may not include historic symmetric keys 114 but instead instructions to not delete historic symmetric keys 114 from computing device 102 (and thus keep these keys as part of the new version). In either embodiment, historic symmetric keys 114 are used by key-file protector 116 to access any historic private keys stored in key file 112. The updated version of existing content manager 108 is able to access content previously protected using historic public keys, which are associated with the historic private keys, such as historic public key 120.

Software update 130 may also include one or more algorithm updates 136, which may include updates to cryptographic algorithms, such as those used to generate the public/private key pairs, encrypt the private keys, or access protected content. For example, if a cryptographic algorithm has been compromised, algorithm updates 136 includes a new cryptographic algorithm to be used. This will further harden the updated version of existing content manager 108 against malicious hacking. Algorithm updates 136 may also include updates to general purpose instructions within existing content manager 108.

Note that one or more of the entities shown in FIG. 1 may be further divided, combined, and so on. Thus, the environment 100 of FIG. 1 illustrates one of many possible environments capable of employing the described techniques.

Generally, any of the functions described herein can be implemented using software, firmware, hardware (e.g., fixed-logic circuitry), manual processing, or a combination of these implementations. The term "tool," as used herein, generally represents software, firmware, hardware, whole devices or networks, or a combination thereof. In the case of a software implementation, for instance, the tools may represent program code that performs specified tasks when executed on a processor (e.g., CPU or CPUs). The program code can be stored in one or more tangible computer-readable memory devices, such as computer-readable media 106 and 126. The features and techniques of the tools are platform-independent, meaning that they may be implemented on a variety of commercial computing platforms having a variety of processors.

Example Process for Updating Content Management Software

The following discussion describes ways in which the tools may operate to enable a computing device to securely and locally generate a public/private key pair as part of an update to content-management software. Aspects of this process may be implemented in hardware, firmware, software, or a combination thereof. This process is shown as sets of blocks that specify operations performed by the tools, such as through one or more devices, and are not necessarily limited to the order shown for performing the operations by the respective blocks. In portions of the following discussion reference may be made to environment 100 of FIG. 1 and to FIGS. 3-5.

Figure 2:
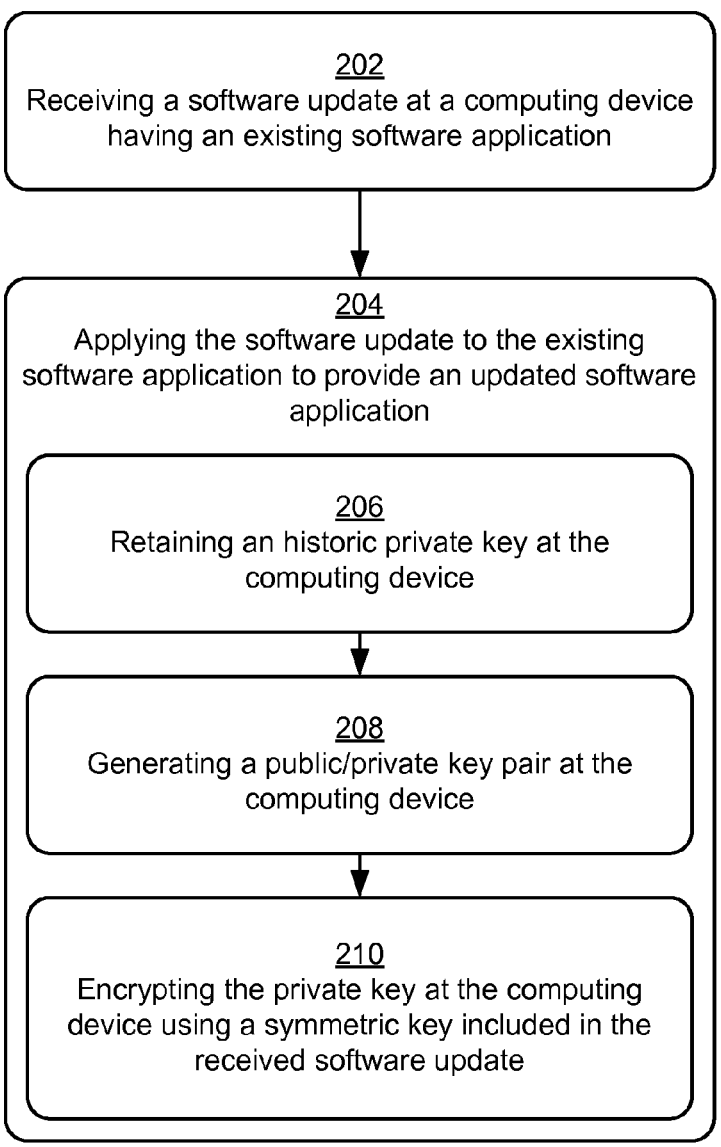
FIG. 2 is a flow diagram depicting an example process, including updating an existing software application.

FIG. 2 is a flow diagram depicting an example process 200 for receiving an update to an existing software application. An example system layout is described as part of this example process, though other system layouts are also contemplated.

Block 202 receives a software update at a computing device having an existing software application. The software update includes a symmetric key. The software update is received from a remote computing device or from a locally-accessible computer-readable storage medium.

Block 204 applies the software update to the existing software application to provide an updated software application. Block 204 may include blocks 206, 208, and 210. Block 206 retains an historic private key at the computing device. The software update may include instructions to not remove an existing historic private key. An historic symmetric key may be retained in a similar manner. Alternatively, the software update may include the historic symmetric key and thus it is applied with the software update. The historic symmetric key is useful for accessing an encrypted form of the historic private key. The historic private key is useful for accessing historic content previously protected by the existing software application using a matching historic public key.

Block 208 generates a public/private key pair at the computing device. The software update includes a request to generate the public/private key pair or computer-executable instructions to perform the generating. The public/private key pair is useful for content protection and includes a public key and a private key. The private key is used to access content protected using the associated public key.

Block 210 encrypts the private key at the computing device using the symmetric key. The encrypted private key is then stored in a key file for later retrieval and decryption using the symmetric key included with the software update.

Figure 3:
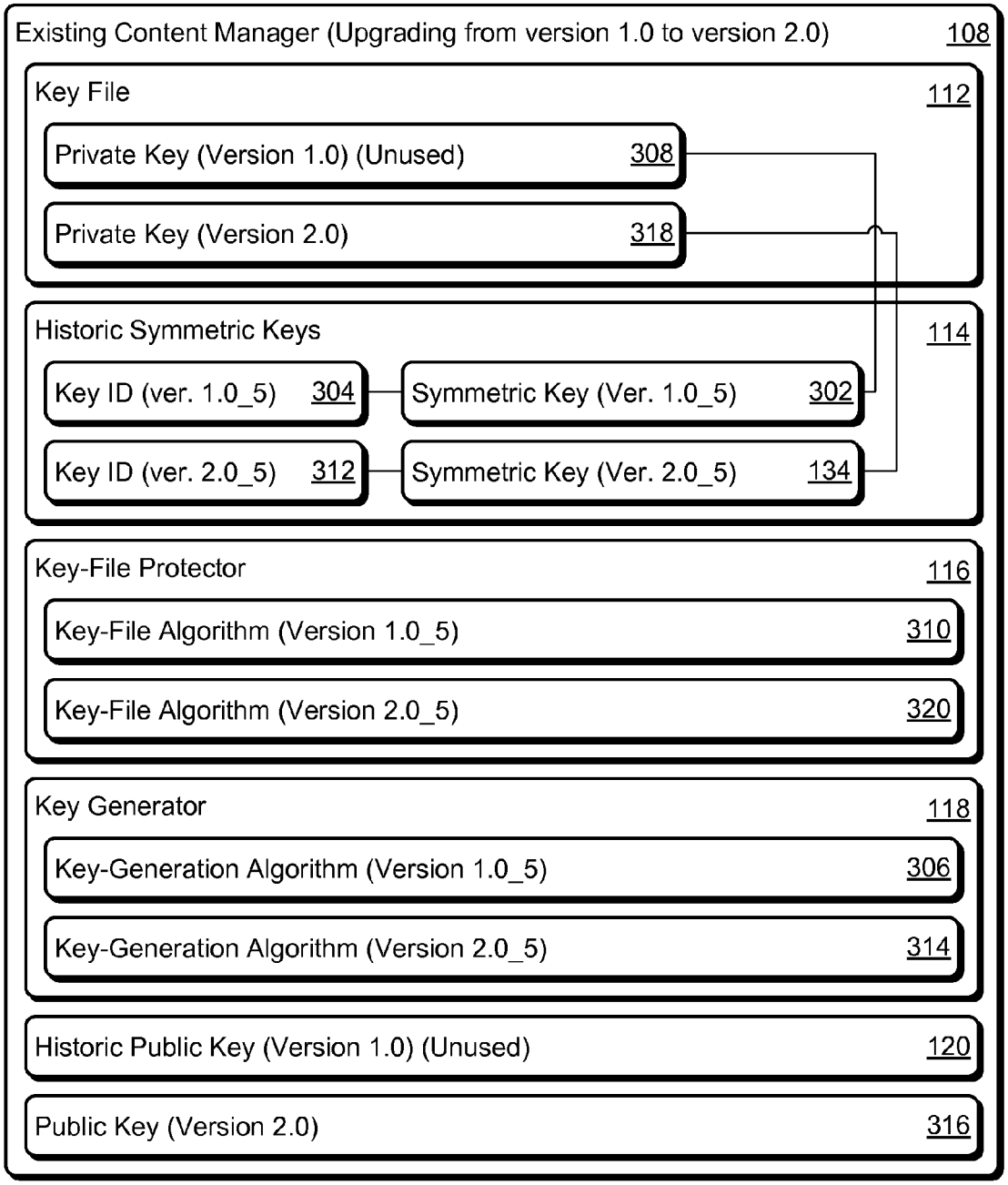
FIG. 3 is a detailed view of the existing content manager as it is being upgraded from version 1.0 to version 2.0.

By way of example, consider FIG. 3. FIG. 3 illustrates a detailed view of existing content manager 108 being upgraded from version 1.0 to version 2.0. First, the history of version 1.0 is explained to further the reader's understanding. An original version, version 1.0, of existing content manager 108 is installed on computing device 102. The installation includes, for example, 1000 symmetric keys, each associated with a particular sub-version (1-1000). Using device-specific information 110 (shown in FIG. 1), sub-version five (e.g., 1.0_5) and its associated symmetric key, symmetric key 302, is chosen. The other 999 symmetric keys are not installed. Symmetric key 302 has an associated key ID 304, such as "1.0_5" or some other simple designator. During installation, key generator 118 executes key-generation algorithm 306 to generate a public/private key pair. This public/private key pair includes historic public key 120 and private key 308. Key-file protector 116 executes key-file algorithm 310 to encrypt private key 308 and store it in key file 112. At no point after upgrading to version 2.0 does existing content manager 108 use historic public key 120 to protect content. Thus, both historic public key 120 and its associated private key 308 are labeled as "(Unused)" in FIG. 3.

Existing content manager 108 periodically checks for updates and during one such check determines that a version 2.0 exists. Existing content manager 108 requests the version 2.0, sub-version five (2.0_5), software update 130 from computing device 122. Key ID 304 ("1.0_5") may be provided to computing device 122 in order to request sub-version five.

In the context of process 200, computing device 102 receives a software update 130, which includes symmetric key 134 associated with sub-version five of version 2.0 (2.0_5). There are 999 other software updates 130 at computing device 122 that are not received. Symmetric key 134 has an associated key ID 312, such as "2.0_5" or some other simple designator. Software update 130 also includes some algorithm updates 136, such as a key-generation algorithm 314 and key-file algorithm 320, which are installed at block 204. Existing content manager 108 removes key-generation algorithm 306 because it has been superseded by key-generation algorithm 314.

Key generator 118 executes key-generation algorithm 314 to generate a new public/private key pair. The new public/private key pair includes public key 316 and private key 318. In this example key generator 118 removes historic public key 120 as it is no longer needed by the updated version (2.0) of existing content manager 108.

In some embodiments, and in this example, key-file protector 116 removes private key 308 as it is unused and thus not needed to access any protected content. Existing content manager 108 also removes symmetric key 302 and key-file algorithm 310 because they are no longer needed to access the removed private key 308. In other embodiments, existing content manager 108 retains private key 308, even though it is unused, and retains key-file algorithm 310.

Key-file protector 116 executes key-file algorithm 320 to encrypt private key 318 and store it in key file 112. Note that private key 308 and private key 318 are both stored in the same key file but are encrypted using different symmetric keys (302 vs. 134) and different algorithms (310 vs. 320).

Figure 4:
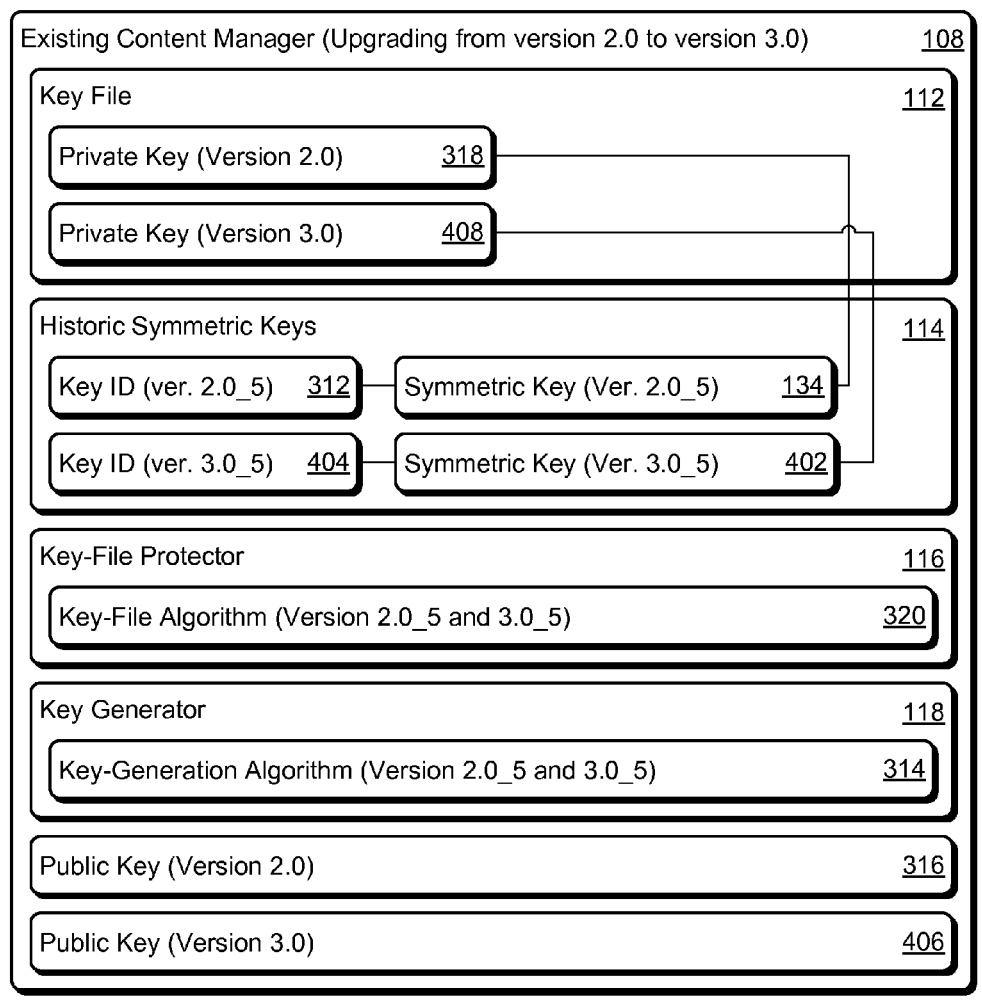
FIG. 4 is a detailed view of the existing content manager as it is being upgraded from version 2.0 to version 3.0.

By way of further example, consider FIG. 4. FIG. 4 illustrates a detailed view of existing content manager 108 being upgraded from version 2.0 to version 3.0 but excludes version 1.0 aspects for visual brevity. At some point prior to upgrading to version 3.0, assume that a user of computing device 102 purchases a music video from a content provider's website.

Existing content manager 108 submits a request for the music video (content) from the website (content provider). The request includes public key 316. The content provider uses public key 316 to protect the music video (content). Existing content manager 108 receives the protected music video (protected content) from the website.

Sometime later the user visits a computer game publisher's website and tries to purchase a game to play on his smart phone (computing device 102). The website is using a content protection scheme associated with version 3.0 of exiting content-manager 108. Thus the website requests that existing content manager 108 be updated to version 3.0 prior to completing the purchase. Existing content manager 108 requests a software update 130 from computing device 122. Existing content manager 108 receives software update 130 at block 202. Software update 130 includes symmetric key 402 associated with sub-version five of version 3.0 (3.0_5). There are 999 other software updates 130 at computing device 122 that are not received. Symmetric key 402 has an associated key ID 404, such as "3.0_5" or some other simple designator. For this version, software update 130 does not include any algorithm updates 136. For example, key-generation algorithm 314 and key-file algorithm 320 remain installed.

Key generator 118 executes key-generation algorithm 314 to generate a new public/private key pair. The new public/private key pair includes public key 406 and private key 408. In this example, key generator 118 removes public key 316 as it is no longer needed by the updated version (3.0) of existing content manager 108. Key-file protector 116 retains private key 318 for use in accessing content previously protected (the music video) using public key 316. Existing content manager 108 also retains symmetric key 134 for use in accessing private key 318. Key-file protector 116 executes key-file algorithm 320 to encrypt private key 408 and store it in key file 112.

Now that existing content manager 108 is updated to version 3.0, the game publisher's website allows the purchase. Existing content manager 108 provides public key 406 to the game publisher's website (an example of a content provider). The content provider uses public key 406 to protect the computer game (an example of content). Existing content manager 108 receives the protected computer game (an example of protected content) from the website and uses private key 408 to access the computer game so that the user can play it.

Figure 5:
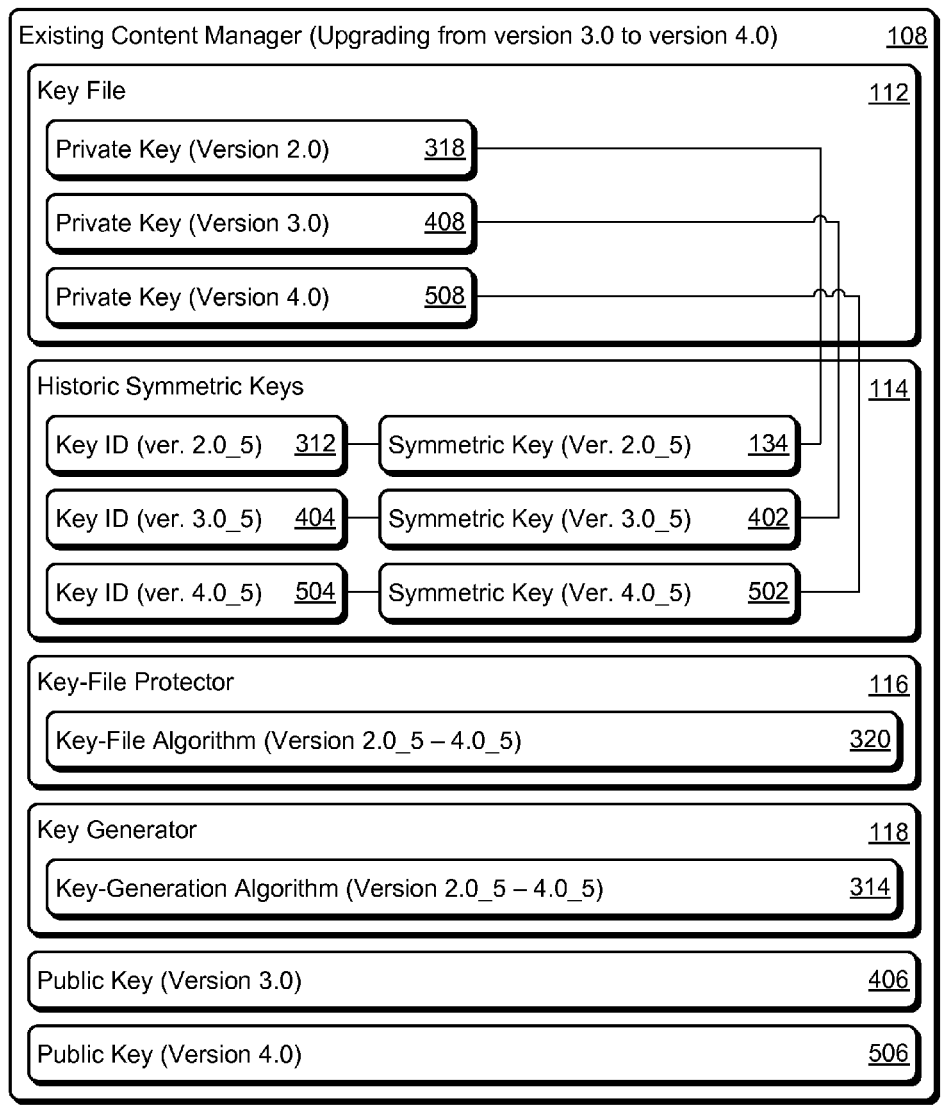
FIG. 5 is a detailed view of the existing content manager as it is being upgraded from version 3.0 to version 4.0.

By way of further example, consider FIG. 5. FIG. 5 illustrates a detailed view of existing content manager 108 being upgraded from version 3.0 to version 4.0, but excludes version 1.0 aspects for visual brevity. Remember that existing content manager 108 used public key 406 to protect the computer game. Existing content manager 108 performs a periodic check for updates and requests a software update from computing device 122. Existing content manager 108 receives software update 130 at block 202. Software update 130 includes symmetric key 502 associated with sub-version five of version 4.0 (4.0_5). There are 999 other software updates 130 at computing device 122 that are not received. New symmetric key 502 has an associated key ID 504, such as "4.0_5" or some other simple designator. For this version, software update 130 does not include any algorithm updates 136. For example, key-generation algorithm 314 and key-file algorithm 320 remain installed.

Key generator 118 executes key-generation algorithm 314 to generate a new public/private key pair. The new public/private key pair includes public key 506 and private key 508. In this example, key generator 118 removes public key 406 as it is no longer needed by the updated version (5.0) of existing content manager 108. Key-file protector 116 retains private key 318 for use in accessing content previously protected using public key 316 and private key 408 for use in accessing content previously protected using public key 406. Existing content manager 108 also retains symmetric key 134 for use in accessing private key 318 and symmetric key 402 for use in accessing private key 408. Key-file protector 116 executes key-file algorithm 320 to encrypt private key 508 and store it in key file 112.

While the examples of FIGS. 3-5 depict upgrading versions in succession (e.g., version 1.0_5 to 2.0_5, 2.0_5 to 3.0_5, and 3.0_5 to 4.0_5), it is contemplated that versions may be skipped. For example, existing content manager 108 may be upgraded from version 1.0_5 to version 4.0_5 with one software update. This software update may include symmetric keys 302, 134, and 402 even though symmetric keys 134 and 402 were not ever used by version 1.0_5 of existing content manager 108.

Figure 6:
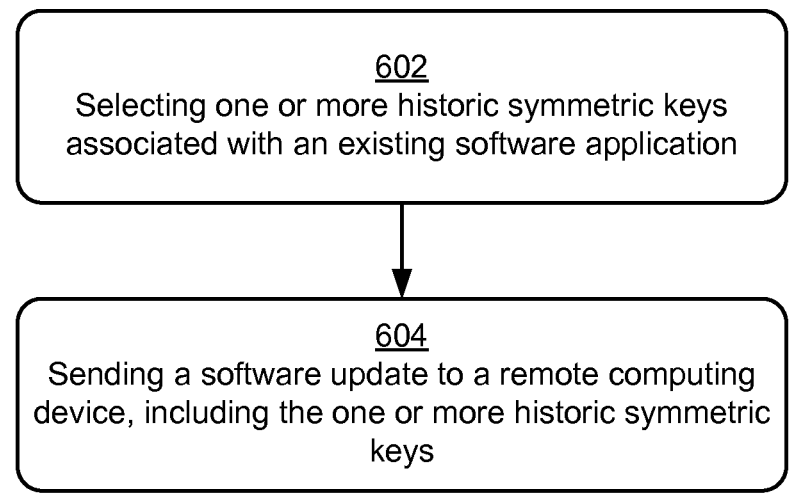
FIG. 6 is a flow diagram depicting an example process, including distributing an update to an existing software application.

FIG. 6 is a flow diagram depicting an example process 600 for distributing an update to an existing software application. An example system layout is described as part of this example process, though other system layouts are also contemplated.

A request for an update to an existing software application is received from a remote computing device. Block 602 selects one or more historic symmetric keys associated with the existing software application. The selection may use version and/or sub-version information present in the request. The selection may include choosing a software update from a set of N software updates each associated with a different sub-version of the existing software application, as described above. The chosen software update includes the one or more historic symmetric keys or instructions to retain those keys. Alternatively, the selection may include selecting the one or more historic symmetric keys and packaging them, or the instructions to retain those keys, within a software update.

Block 604 sends the software update to the remote computing device. The software update also includes a new symmetric key that may have been generated using a key-file-key seed as described above.

Continuing the example of FIG. 5, existing content manager 108 performs a periodic check for updates and sends a request for a software update to computing device 122. The request includes version and sub-version information, such as such as "3.0_5" (key ID 404) or some other simple designator. Update selector 132, using the version and sub-version information, selects a software update 130 (4.0_5) out of a pool of 1000 software updates 130, each with a different sub-version as described above. The selected software update 130 includes symmetric keys 302 (not shown in FIG. 5), 134, and 402 as well as symmetric key 502. Computing device 122 sends software update 130 to computing device 102. At computing device 102 it may be determined that historic symmetric key 302 is no longer needed and thus may be removed.

Conclusion

This document describes tools that enable a computing device to receive an update to content management software. The tools also enable the computing device to generate new public and private keys without the use of a key server. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising: receiving a software update at a computing device having an existing software application, the existing software application having an historic public/private key pair including an historic private key and an historic public key, the historic private key usable by the existing software application to access historic protected content, the historic protected content previously protected using the historic public key and the existing software application; and applying the software update to the existing software application to provide an updated software application, applying the software update including:

retaining the historic private key for use by the updated software application to access the historic protected content, the historic private key not usable to access new protected content, the new protected content protected by a new public key and the updated software application;

generating a new public/private key pair locally at the computing device, the new public/private key pair including the new public key and a new private key, the new public key usable to protect content to provide the new protected content, the new private key usable by the updated software application to access the new protected content;

encrypting the new private key at the computing device using a symmetric key included in the software update to create an encrypted private key thereby preventing the new private key from being determined by unauthorized software applications or users;

storing the encrypted private key within a key file located at the computing device, the updated software application capable of accessing the new private key by decrypting the encrypted private key using the symmetric key;

removing the historic public key in the historic public/private key pair from local storage at the computing device;

and in an event that one or more retained historic private keys are unused, removing from the local storage at the computing device:

the one or more retained historic private keys that are unused; and one or more retained historic symmetric keys that are usable to generate the one or more retained historic private keys that are unused.

2. The method as recited in claim 1, further comprising:

submitting a request for content to a content provider, the request including the new public key;

receiving the requested content from the content provider, the requested content protected using the new public key; and accessing the requested content using the new private key.

3. The method as recited in claim 2, wherein the content is an audio or video file.

4. The method as recited in claim 1, wherein the software update includes an historic symmetric key and the key file includes the historic private key in an encrypted form that can be decrypted using the historic symmetric key.

5. The method as recited in claim 1, wherein applying the software update includes retaining an historic symmetric key and the key file includes the historic private key in an encrypted form that can be decrypted using the historic symmetric key.

6. The method as recited in claim 1, wherein:

an original installation of the existing software application has sub-versions each associated with other symmetric keys;

a particular sub-version of the sub-versions is selected based on device-specific information associated with the computing device;

the software update is one of multiple software updates, each of the multiple software updates associated with one of the sub-versions of the original installation of the existing software application; and the software update and the symmetric key are associated with the particular sub-version and the software update does not include symmetric keys associated with others of the sub-versions.

7. The method as recited in claim 1, wherein encrypting the new private key includes altering one or more cryptographic algorithms using device-specific information unique to the computing device.

8. The method as recited in claim 7, wherein altering the cryptographic algorithms includes setting an initialization vector of at least one of the cryptographic algorithms using the device-specific information.

9. The method as recited in claim 7, wherein device-specific information includes one or more of:
   a serial number associated with one or more hardware components of the computing device;
   a hardware identifier associated with one or more hardware components of the computing device;
   a media-access-control (MAC) address associated with a network adapter of the computing device; or
   a globally-unique-identifier (GUID) associated with the computing device.

10. The method as recited in claim 1, wherein the symmetric key is created by a key authority using a key-file-key seed, the key-file-key seed altering one or more cryptographic algorithms so that a master-secret key is capable of deriving the symmetric key.

11. The method as recited in claim 1, wherein generating the new public/private key pair includes altering one or more cryptographic algorithms using device-specific information unique to the computing device.

12. The method as recited in claim 11, wherein altering the cryptographic algorithms includes setting an initialization vector of at least one of the cryptographic algorithms using the device-specific information.

13. The method as recited in claim 11, wherein device-specific information includes one or more of:
   a serial number associated with one or more hardware components of the computing device;
   a hardware identifier associated with one or more hardware components of the computing device;
   a media-access-control (MAC) address associated with a network adapter of the computing device; or
   a globally-unique-identifier (GUID) associated with the computing device.

14. One or more computer-readable storage memory having stored thereon computer-executable instructions that, if executed by a computing device, cause the computing device to perform a method comprising:
   receiving a software update at the computing device, the computing device including an existing software application having an historic public/private key pair including an historic private key and an historic public key, the historic private key usable by the existing software application to access historic protected content, the historic protected content previously protected using the historic public key and the existing software application; and
   applying the software update to the existing software application to provide an updated software application, applying the software update including:
      retaining the historic private key for use by the updated software application to access the historic protected content, the historic private key not usable to access new protected content, the new protected content protected by a new public key and the updated software application;
      generating a new public/private key pair locally at the computing device, the new public/private key pair including the new public key and a new private key, the new public key usable to protect content to provide the new protected content, the new private key usable by the updated software application to access the new protected content;
      encrypting the new private key at the computing device using a symmetric key included in the software update to create an encrypted private key;
      storing the encrypted private key within a key file located at the computing device, the updated software application capable of accessing the new private key by decrypting the encrypted private key using the symmetric key;
      removing the historic public key in the historic public/private key pair from local storage at the computing device; and
      in an event that one or more unused historic private keys are locally stored at the computing device, removing from local storage at the computing device:
         one or more unused private keys; and
         one or more retained historic symmetric keys that are usable to generate the one or more unused private keys.

15. The memory as recited in claim 14, wherein the software update includes an historic symmetric key and the key file includes the historic private key in an encrypted form that can be decrypted using the historic symmetric key.

16. The memory as recited in claim 14, wherein encrypting the new private key includes altering one or more cryptographic algorithms using device-specific information unique to the computing device.

17. The memory as recited in claim 16, wherein altering the one or more cryptographic algorithms includes setting an initialization vector of at least one of the cryptographic algorithms using the device-specific information.

18. The memory as recited in claim 16, wherein the device-specific information includes one or more of:
   a serial number associated with one or more hardware components of the computing device;
   a hardware identifier associated with one or more hardware components of the computing device;
   a media-access-control (MAC) address associated with a network adapter of the computing device; or
   a globally-unique-identifier (GUID) associated with the computing device.

19. The memory as recited in claim 14, wherein the symmetric key is created by a key authority using a key-file-key seed, the key-file-key seed altering one or more cryptographic algorithms so that a master-secret key is capable of deriving the symmetric key.

20. The memory as recited in claim 14, wherein the software update includes an historic symmetric key and the key file includes the historic private key in an encrypted form that can be decrypted using the historic symmetric key.

* * * * *